United States Patent [19]
Gerfast et al.

[11] Patent Number: 5,480,103
[45] Date of Patent: Jan. 2, 1996

[54] MECHANICALLY INCOMPATIBLE MAGNETIC RECORDING TAPE CARTRIDGES HAVING THE SAME FORM FACTOR

[75] Inventors: Sten R. Gerfast, Mendota Heights; Daniel C. Egan, St. Paul, both of Minn.

[73] Assignee: Minnesota Mining and Manufacturing Company, St. Paul, Minn.

[21] Appl. No.: 328,749

[22] Filed: Oct. 24, 1994

Related U.S. Application Data

[63] Continuation of Ser. No. 73,592, Jun. 8, 1993, abandoned.

[51] Int. Cl.⁶ ............................................. G11B 23/087
[52] U.S. Cl. ............................................. 242/347
[58] Field of Search .......................... 242/347, 352.4; 360/132

[56] References Cited

U.S. PATENT DOCUMENTS

| | | |
|---|---|---|
| 3,940,799 | 2/1976 | Matsumoto et al. . |
| 3,971,071 | 7/1976 | Urayama . |
| 4,012,011 | 3/1977 | Saito . |
| 4,460,930 | 7/1984 | Takahashi . |
| 4,549,240 | 10/1985 | Hodges . |
| 4,769,732 | 9/1988 | Tanaka . |
| 4,816,953 | 3/1989 | Ohyama et al. . |
| 4,898,338 | 2/1990 | Oishi . |
| 5,113,297 | 5/1992 | Yoshida . |
| 5,161,079 | 11/1992 | Ohshima et al. . |
| 5,240,200 | 8/1993 | Nishimura et al. ............ 242/336 |
| 5,253,136 | 10/1993 | Suzuki et al. . |

FOREIGN PATENT DOCUMENTS

| | | |
|---|---|---|
| 0040686 | 12/1981 | European Pat. Off. . |
| 0091171 | 10/1983 | European Pat. Off. . |
| 0205074 | 12/1986 | European Pat. Off. . |
| 0389121 | 9/1990 | European Pat. Off. . |
| 0391465 | 10/1990 | European Pat. Off. . |
| 0463575 | 1/1992 | European Pat. Off. . |
| 0506054 | 9/1992 | European Pat. Off. . |
| 2131000 | 6/1984 | United Kingdom . |
| 2208330 | 3/1989 | United Kingdom . |

OTHER PUBLICATIONS

Westlake Technology Corporation, et al., Wide Tape Lockout Proposals, Feb. 15, 1993.
American National Standards Institute, Inc., American National Standard for information processing–unrecorded magnetic tape cartridge for information interchange, 0.250 inch (6.30 mm), 1600 bpi (63 bpmm), phase encoded, ANSI X3.55–1982, Jun. 17, 1982.
3rd Draft, Proposed American National Standard–Unrecorded Magnetic Tape Mini–Cartridge for Information Interchange, Dated Oct. 12, 1987 (ASCX3 Project No. 553), Prepared by Technical Committee X3B5 of Accredited Standards Committee X3.
2nd Draft, Proposed American National Standard–Unrecorded Magnetic Tape Mini–Cartridge For Information Interchange, Dated Oct. 12, 1987, Prepared by Technical Committee X3B5 of Accredited Standards Committee X3.

*Primary Examiner*—Daniel P. Stodola
*Assistant Examiner*—John P. Darling
*Attorney, Agent, or Firm*—Gary L. Griswold; Walter N. Kirn; Charles L. Dennis, II

[57] ABSTRACT

Mechanical incompatibility features between a first and a second belt-driven magnetic recording tape cartridge comprise a shorter rail-mating channel and a countersunk lip in one of the side walls of the first cartridge. The features prevent the first cartridge from being inserted into a tape drive for reading the second cartridge, and vice versa, in order to mechanically distinguish between belt-driven cartridges containing magnetic tapes with different recording characteristics, but having the same form factor.

5 Claims, 5 Drawing Sheets

MECHANICALLY INCOMPATIBLE MAGNETIC RECORDING TAPE CARTRIDGES HAVING THE SAME FORM FACTOR

This is a continuation of application 08/073,592 filed Jun. 8, 1993, now abandoned.

TECHNICAL FIELD

This invention involves belt-driven magnetic recording tape cartridges, and particularly features incorporated into the cartridges to mechanically distinguish between belt-driven cartridges containing magnetic tapes with different recording characteristics, but having the same form factor.

BACKGROUND

A popular type of magnetic data recording tape is contained within a belt-driven cartridge, commonly called a "tape cartridge" or "data cartridge." The cartridge encloses the tape, which is wound on two reels or hubs driven by a friction-coupled endless internal belt and capstan system in which the belt contacts the periphery of the wound tape and the capstan engages an external drive mechanism in a magnetic tape drive. In this specification and in the claims, the term "tape cartridge" will refer to a belt-driven magnetic recording tape cartridge of this type.

The highly compact and economical data storage provided by these tape cartridges makes them well suited for use in backup and data recovery operations, as well for storage of large volumes of data that does not need to be accessed in a random manner. Presently, these tape cartridges are operated by driving the tape past a read/write head assembly of a tape drive in a linear or longitudinal fashion at speeds between about 25–150 in/s (0.64–3.66 m/s). The magnetic data on the tape is recorded or read in a linear serpentine path.

The relatively high drive speeds and the high density at which magnetic data is recorded on these tapes require that the tape have a modulus of elasticity that is very stable in the longitudinal direction. As a result, the tape cartridges of the present invention are constructed so as to minimize the longitudinal tension on the tape that might otherwise alter the dimensional characteristics of the tape. Unlike conventional audio cassette tapes, for example, which directly drive one of the tape hubs, the tape cartridges of the present invention use the friction-coupled endless internal belt and capstan system to drive the tape past the read/write head assembly without directly tensioning the tape itself.

The minimum requirements for the physical and magnetic interchange of one tape cartridge of this type are presented in American National Standard X3.55-1982 and subsequent Standards incorporating X3.55-1982. Requirements for a similar but smaller "magnetic tape mini-cartridge" are presented in Proposed American National Standard X3B5/87-218, 3rd Draft, Oct. 12, 1987. Alternate standards for tape cartridges have been developed by Quarter Inch Cartridge Drive Standards, Inc. (QIC), Santa Barbara, Calif., such as QIC Development Standards QIC-136, Rev. C, 3 Dec. 1992; QIC-137, Rev. C, 4 Mar. 1993; and QIC-143, Rev. B, 3 Dec. 1992. Tape cartridges configured so as to meet the minimum physical requirements set forth in these type of standards are said to have a "form factor" as generally defined by the peripheral dimensions and configuration specified by the appropriate standard or draft standard.

For a variety of economic and manufacturing reasons, it would be desirable to provide a tape cartridge for a different type of tape drive that has the same form factor as existing tape cartridges. If there are different recording and dimensional characteristics of the magnetic tape for the different tape drive, however, such a tape cartridge must be distinguishable from existing tape cartridges of the same form factor.

Current techniques for distinguishing between different tape cartridges having the same form factor typically rely either on the read/write head assembly to magnetically detect a non-conforming tape format, or on some type of interaction between a physical feature of tape cartridge and a sensing circuit in the tape drive. European Patent Application 0 389 121, for example, describes a data protection feature for a tape cartridge that enables sensing circuitry within the tape drive to distinguish between two different types of tape cartridges having otherwise identical form factors.

SUMMARY OF THE INVENTION

In accordance with a first embodiment, the invention is a housing for a first belt-driven tape cartridge that has a substantially similar form factor but is mutually incompatible with a second belt-driven tape cartridge of the same form factor. The housing comprises a top plate having a top surface and periphery outline substantially the same as the periphery outline of the physical form factor; a front wall perpendicularly attached to the top plate along a front edge margin of the top plate and having a front surface including: structure defining a belt-driven tape transport aperture, and structure defining a separate read/write access aperture; a back wall perpendicularly attached to the top plate along a back edge margin of the top plate; and a pair of side walls perpendicularly attached to the top plate along respective side edge margins of the top plate, each side wall having a side surface. At least one of the side walls includes a countersunk lip having transverse edges defined along a portion of the side edge margin of the top plate and indented from the top surface and the side surface, and at least one of the side walls includes an indented rail-mating channel defining a rib along the top of the portion of the side wall and extending backward along a portion of the side wall from the margin of the front surface that is less than a distance of a similar indented rail-mating channel in the second tape cartridge. The housing for the first tape cartridge has substantially the same form factor as the second tape cartridge, but the first tape cartridge can not be inserted into a tape drive for reading the second tape cartridge due to the distance of the indented rail-mating channel of the one of the side walls being less than the distance of the similar indented rail-mating channel in the second tape cartridge. Conversely, the second tape cartridge cannot be inserted into a tape drive for reading the first tape cartridge due to a lack of the countersunk lip on the one of the side walls.

In accordance with a second embodiment, the invention is a housing for a first belt-driven tape cartridge that has a substantially similar form factor but is backward incompatible with a second belt-driven tape cartridge of the same form factor. The second tape cartridge includes a pair of identical indented rail-mating channels along a respective one of each of a pair of side wall for mating with a pair of identical mounting rails in a tape drive for reading the second tape cartridge. The housing for the first tape cartridge comprises: a top plate having a top surface and periphery outline substantially the same as the periphery outline of the physical form factor; a front wall perpendicularly attached to the top plate along a front edge margin of the top plate; a back wall perpendicularly attached to the top plate along a back edge margin of the top plate; and a first side wall and a second side wall perpendicularly attached to the top plate along respective side edge margins of the top plate. A front surface on the front wall includes: structure defining a belt-driven tape transport aperture, structure defining a separate read/write access aperture, and a door covering the read/write access aperture and pivoting about an axis that is adjacent a corner of the front wall along the first side wall and perpendicular to the top plate, the door including a portion that extends beyond the axis to the side margin of the first side wall. A first indented rail-mating channel extends backward along a portion of the first side wall from the front edge margin a distance that is substantially the same as a distance of the identical indented rail-mating channels in the second tape cartridge such that a mounting rail in a tape drive for reading the first tape cartridge will engage the portion of the door that extends beyond the axis as the mounting rail slides along the indented channel to open the door and provide access to the read/write access aperture. A second indented rail-mating channel extends backward along a portion of the second side wall from the front edge margin a distance that is substantially less than the distance of the identical indented rail-mating channels of the second tape cartridge such that the first tape cartridge can not be inserted into the tape drive for reading the second tape cartridge.

DETAILED DESCRIPTIONS OF THE PREFERRED EMBODIMENT

Figure 1:
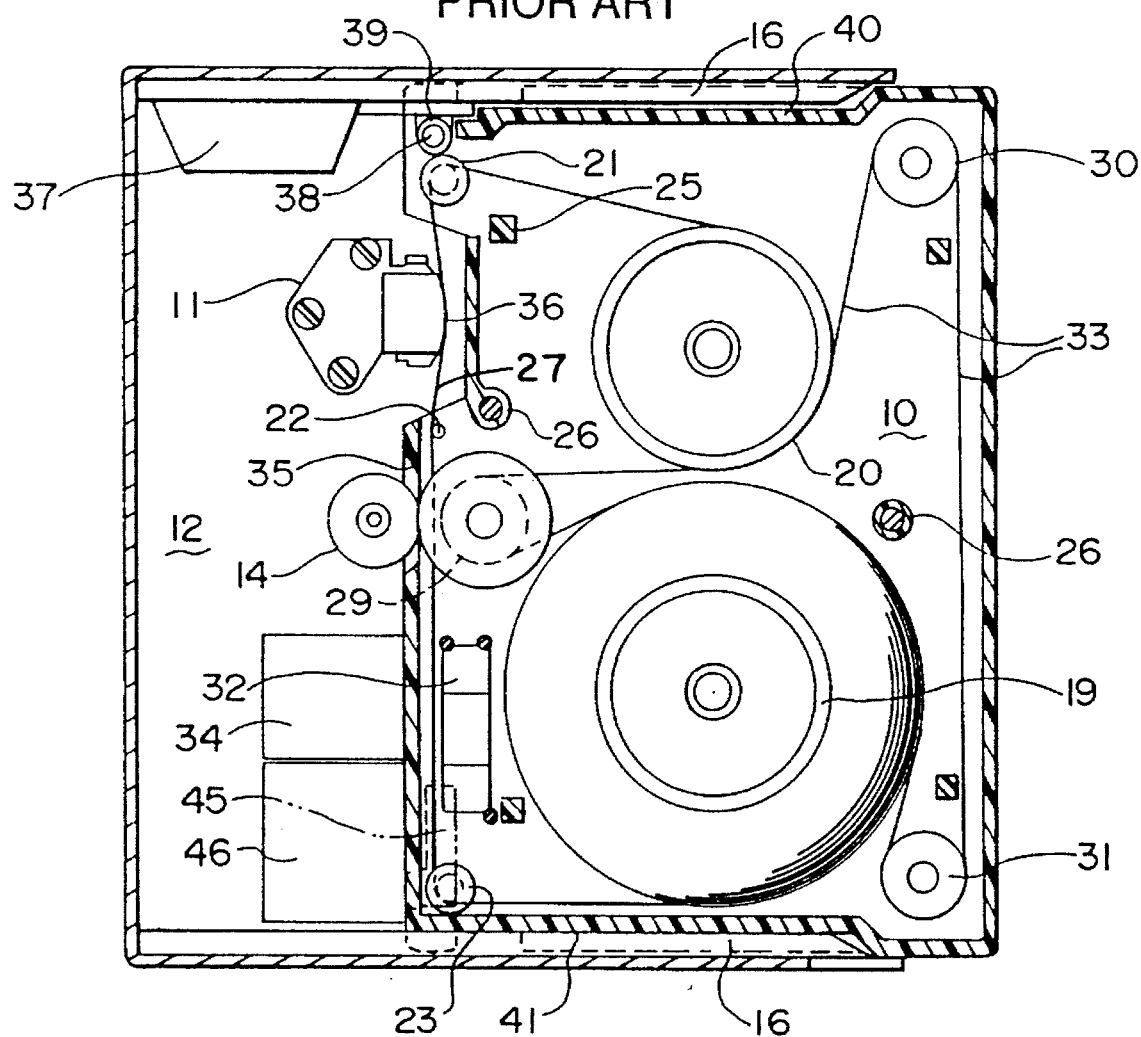
FIG. 1 is a sectional top view of an existing tape cartridge shown positioned in an existing linear serpentine path belt-driven tape drive.

FIGS. 1–4 show an existing belt-driven mini-cartridge 10. In FIG. 1, mini-cartridge 10 is shown positioned in a tape transport portion 12 of a belt-driven tape drive (a machine for reading, writing, and erasing magnetic data to and from the tape as appropriate, the electronics and other portions of which are not shown). It will be understood that the belt-driven tape drive may record magnetic data on the tape in any format, depending upon the configuration of a read/write assembly 11 of the tape drive.

Figure 2:
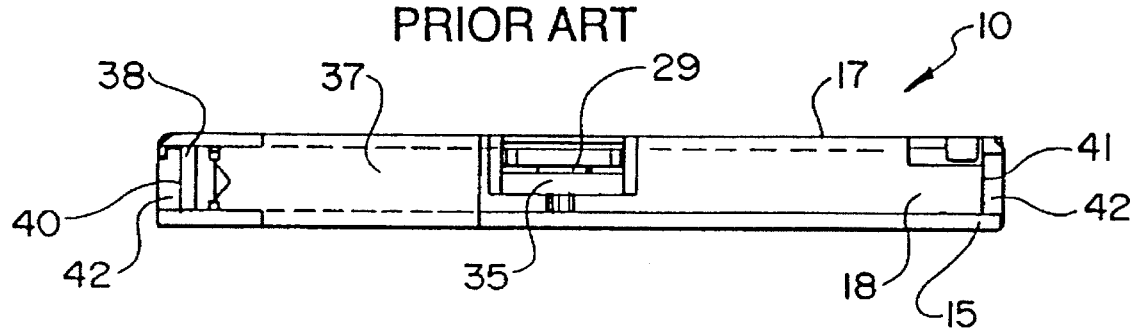
FIG. 2 is an edge view showing the front wall of the tape cartridge of FIG. 1.

As shown in FIG. 2, tape cartridge 10 includes a base plate 15 and a cover 17, together defining a relatively thin, generally rectangular enclosure having a front wall 18. FIG. 1 shows that within cover 17 are reel hubs 19 and 20, tape guides 21, 22 and 23, supports 25, screw holes 26, tape 27, belt driving capstan 29, belt guide rollers 30 and 31 and drive belt 33.

Reel hubs 19 and 20 are supported by cover 17 for free rotation about spaced parallel axes. Tape 27 is wound on reel hubs 19 and 20 in opposite directions about their axes. A tape guide path between the reel hubs is defined by the three guide pins 21, 22 and 23. One tape guide pin 21 is at one side of a cartridge cutaway portion 36, and the other two tape guide pins 22 and 23 are along and behind front wall 18 on the opposite side of cutaway portion 36.

Drive belt 33 is thin, continuous, flexible, elastic and uniform in cross section. Drive belt 33 extends in a belt guide path that takes it around belt driving capstan 29 and belt guide rollers 30 and 31, contacting tape 27 on reel hubs 19 and 20. The elasticity, length, pretension and angle of wrap of belt 33 at the reel hubs provide the necessary contact to assure frictional driving of tape 27 and reel hubs 19 and 20 by drive belt 33.

An opening 35 in front wall 18 of cover 17 provides access for a drive roller 14, part of tape transport portion 12 of the tape drive, to contact belt driving capstan 29. Rotation of belt driving capstan 29 by drive roller 14 of tape transport portion 12 causes belt 33 and tape 27 to move. Similarly, through cutaway portion 36 in front wall 18, read/write assembly 11 of tape transport portion 12 contacts magnetic tape 27. Cutaway portion 36 is normally covered by a door 37, which is pivoted on stud 38 adjacent a corner of cartridge 10, and biased by torsion spring 39 towards its closed position, flush with front wall 18.

Figure 3:
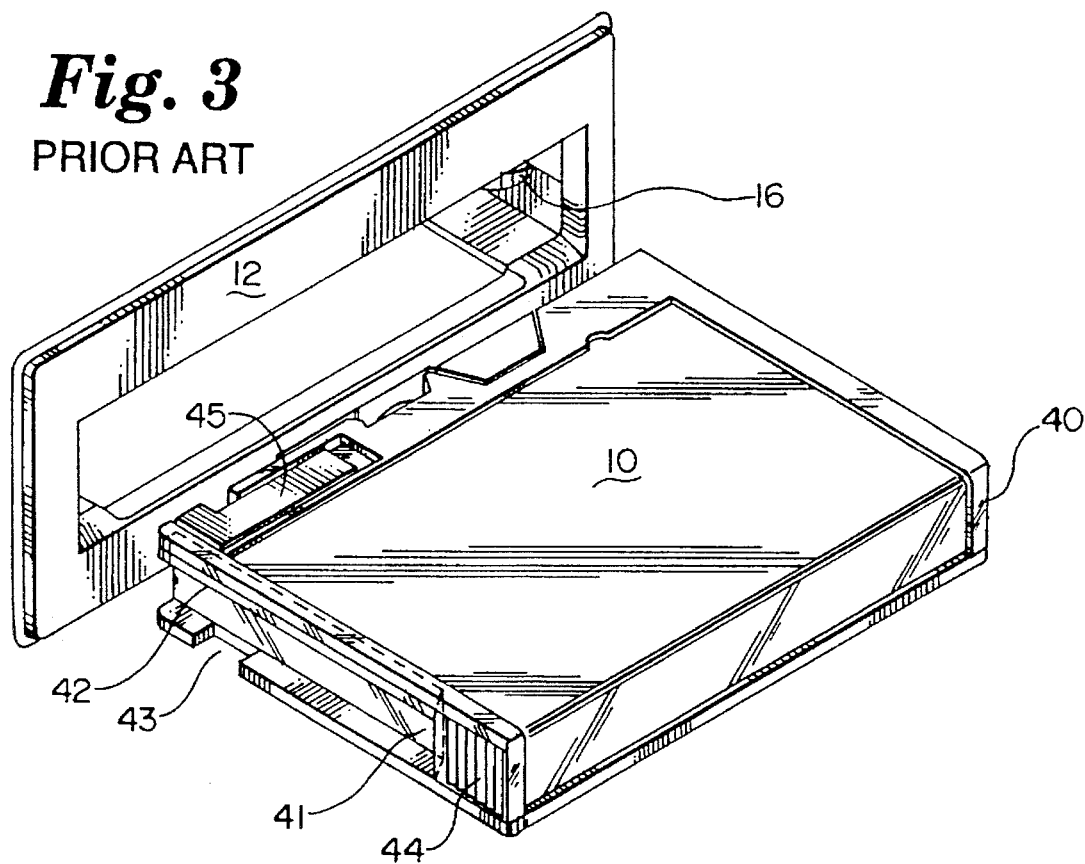
FIG. 3 is a top perspective view of the tape cartridge of FIG. 1 shown positioned for insertion in the existing belt-driven tape drive.
Figure 4:
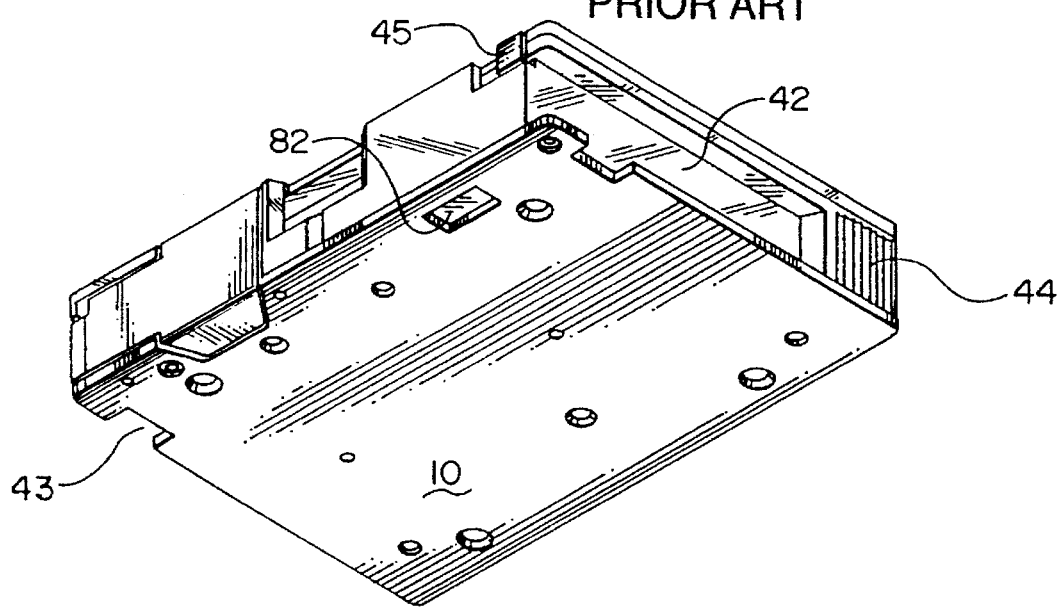
FIG. 4 is a bottom perspective view of the tape cartridge of FIG. 3.

As shown best in FIGS. 3 and 4, opposed side walls 40 and 41 of cartridge 10 each include a similar rail-mating channel or recess 42 as shown in FIG. 4 that is defined along substantially the entire length of each of the side walls to expose a corresponding outermost portion of each side of base plate 15, including positioning notch 43. At the rear portion of each side wall 40 and 41, a series of ridges and grooves provides a gripping portion 44 to allow a user to easily handle and insert cartridge 10 by gripping cartridge 10 between a thumb and a finger, for example, positioned at gripping portions 44. A physical read/write indicator 45 is positioned on front wall 18 to interact with a sensing mechanism/circuit 46 in tape transport portion 12 to determine the write protection status of the tape cartridge 10. An optical tape sensor 32 is positioned just behind front wall 18 to interact with a tape sensing mechanism/circuit 34 to determine the end-of-tape status of tape cartridge 10.

As shown in FIGS. 1 and 3, a pair of substantially identical elongate mounting rails 16 within tape transport portion 12 are positioned to mate over the exposed outermost portions of base plate 15 and along recesses 42 of side walls 40 and 41 to guide cartridge 10 into position as it is inserted, front wall 18 forward, into tape transport portion 10. Door 37 extends beyond its pivot stud 38 into a recessed portion of adjacent side wall 40, and the leading edge of the corresponding elongate rail 16 pivots door 37 to an open position as cartridge 10 is inserted into tape transport portion 10. Once in position, a pair of tabs (not shown) in tape transport portion 12 engage notches 43 on base plate 15 as read/write assembly 11 and drive roller 14 are moved into operable position with tape cartridge 10 in order to firmly secure tape cartridge 10 in position within tape transport portion 12.

Due to the high density of the magnetic recordings on the tape cartridges, it will be understood that the tape cartridge must be held in very precise position within the tape drive with respect to the read/write assembly. Several mechanisms in the form factor of tape cartridge 10 operate together with the tape drive to ensure the precise positioning of the tape cartridge. Base plate 15 is preferably made of metal or any other dimensionally stable material so as to decrease the chance of any dimensional changes in the form factor of the tape cartridge due to, for example, environmental conditions or everyday wear and tear. In addition, recesses 42 guide tape cartridge 10 into initial position within tape transport portion 12 and that position is then locked by the interaction of the notches 43 on base plate 15 and the tabs in tape transport portion 12.

Referring now to FIGS. 5–9, an embodiment of a tape cartridge 50 in accordance with the present invention will be described. While tape cartridge 50 of this embodiment has essentially the same form factor as existing tape cartridge 10, tape cartridge 50 is mechanically incompatible with tape transport portion 12 of existing belt-driven tape drives. In one embodiment of the present invention, a new tape drive which reads and writes tape cartridge 50 may also be configured so that existing tape cartridge 10 is mechanically incompatible with such a new tape drive. This mechanical mutual incompatibility is desirable, for example, when the recording and dimensional characteristics of the new tape cartridge are such that insertion of a new tape cartridge into an old tape drive would result in the destruction of magnetic data on the new tape cartridge and vice-versa.

The present invention is applicable to any type of tape drives that have incompatible tape cartridges with the same form factor where a mechanical incompatibility of tape cartridges is required. In the preferred embodiment, tape cartridge 50 is magnetically pre-formatted for certain purposes and the incorrect insertion of one of these tape cartridges 50 into an old tape drive would result in the destruction of the pre-formatting, thereby rendering the tape cartridge essentially useless. Particularly where tape cartridges of this type are used for backup and recovery purposes, there is a critical need for a fail-safe mechanical incompatibility as provided for by the present invention when magnetic tapes having different recording and dimensional characteristics are contained in tape cartridges that have the same form factor.

In the preferred embodiment of the present invention, tape cartridge 50 is adapted for use with an arcuate scanning tape drive of the type shown and described in U.S. patent application Ser. No. 07/898,926 filed Jun. 5, 1992 by James U. Lemke, entitled "Arcuate Scanning Tape Drive," and now abandoned, and assigned to the assignee of the present invention, the disclosure of which is incorporated in this application by reference. A tape transport portion 52 of the arcuate scanning tape drive is functionally similar to tape transport portion 12, except that a read/write assembly 51 is comprised of one or more read/write heads located on a rotatable head carriage that rotates at speeds on the order of 10,000 rpm and uses an arcuate scan path for recording magnetic data on a magnetic tape. Unlike existing tape drives, the tape in an arcuate scanning tape drive moves past the head assembly at speeds less than 1 in/s (2.54 cm/s), and the scan path is essentially perpendicular to the longitudinal length of the tape. In order to achieve high density magnetic recording with this type of tape drive, the magnetic tape must have an elasticity modulus that is very stable in both the longitudinal and transverse dimensions.

Figure 5:
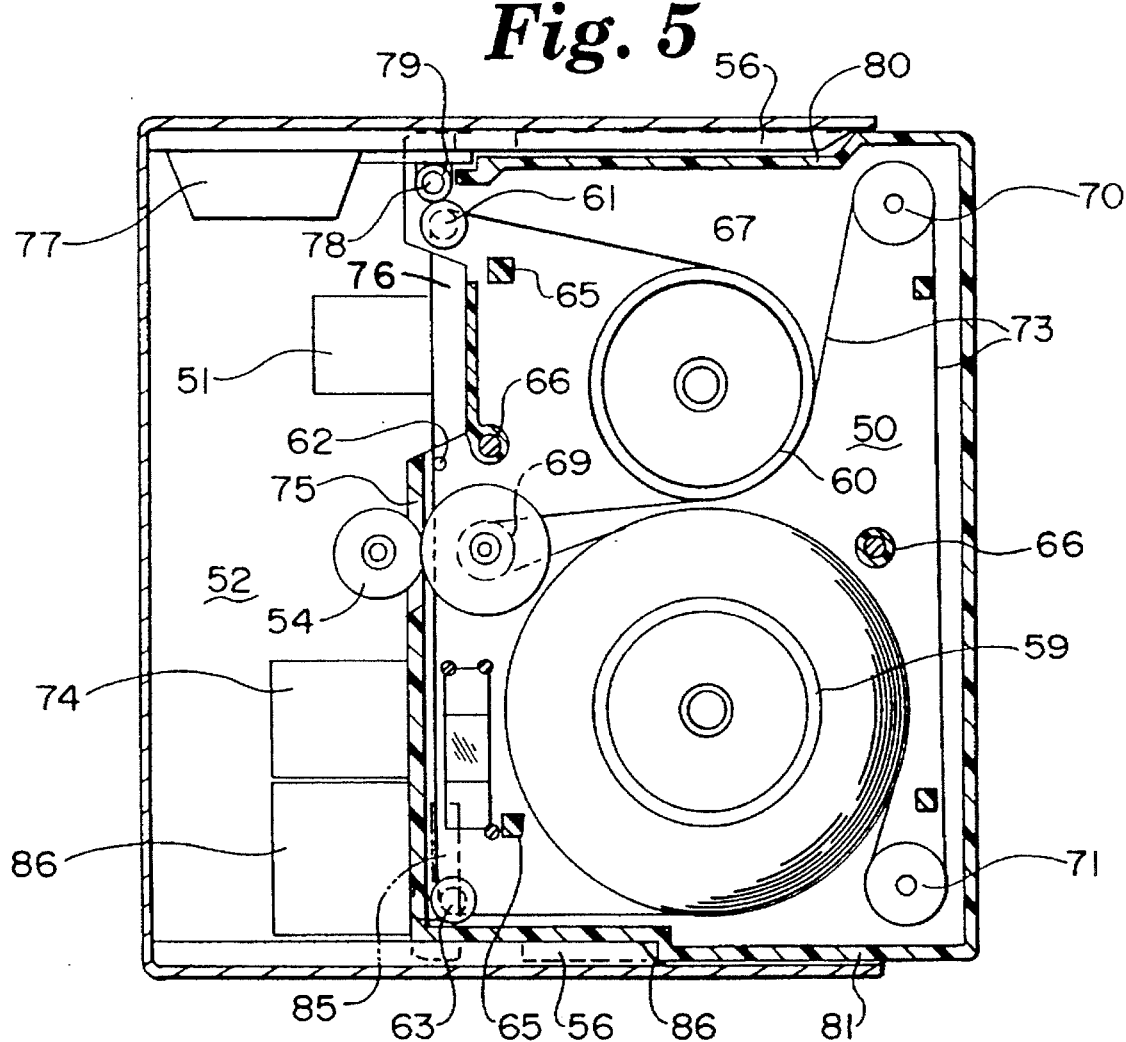
FIG. 5 is a sectional top view of an embodiment of a tape cartridge in accordance with the present invention shown positioned in an arcuate scanning belt-driven tape drive.
Figure 6:
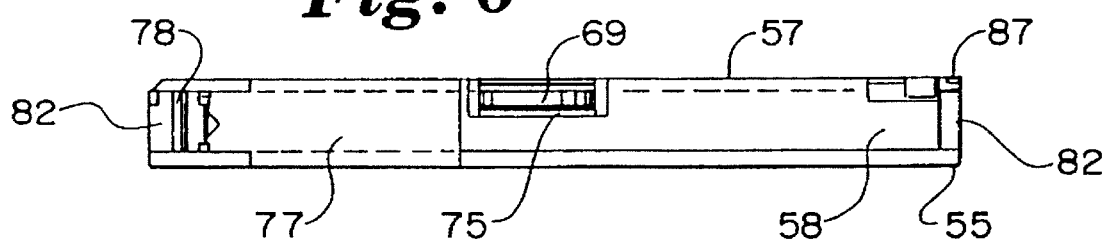
FIG. 6 is an edge view showing the front wall of the tape cartridge of FIG. 5.
Figure 7:
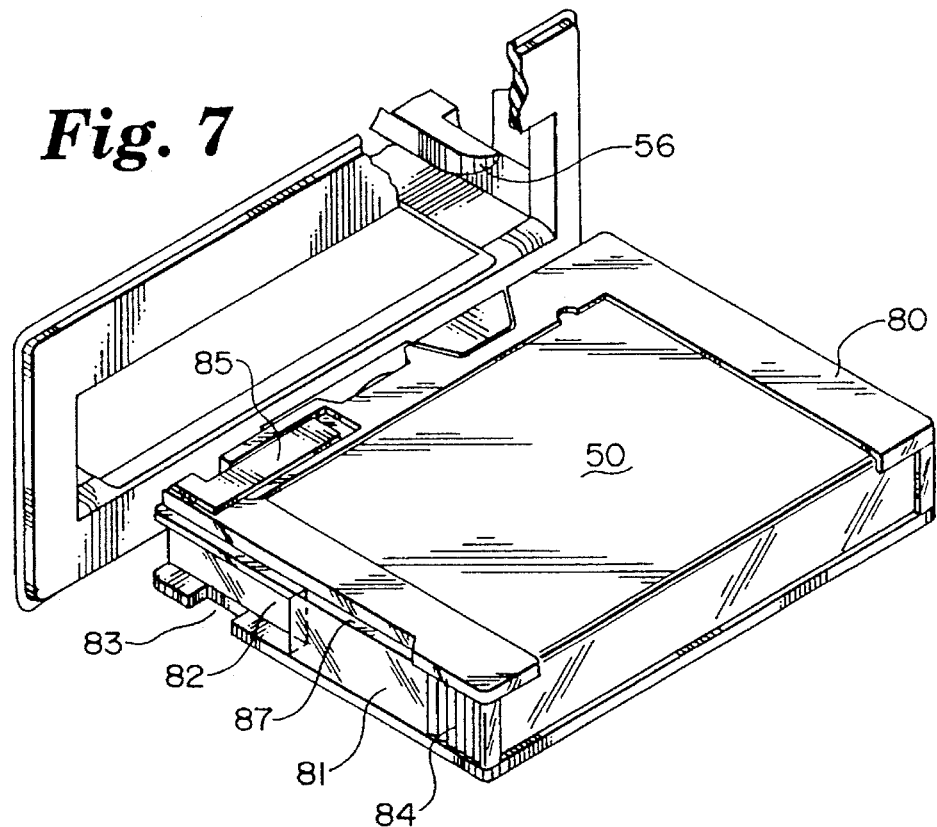
FIG. 7 is a top perspective of the tape cartridge of FIG. 5 shown positioned for insertion in an arcuate scanning belt-driven tape drive.
Figure 8:
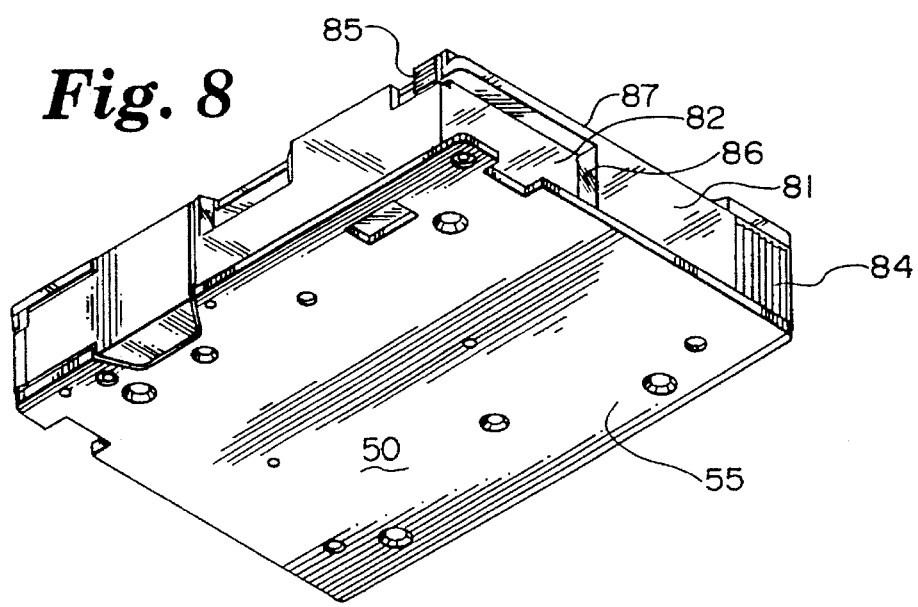
FIG. 8 is a bottom perspective view of the tape cartridge of FIG. 7.
Figure 9:
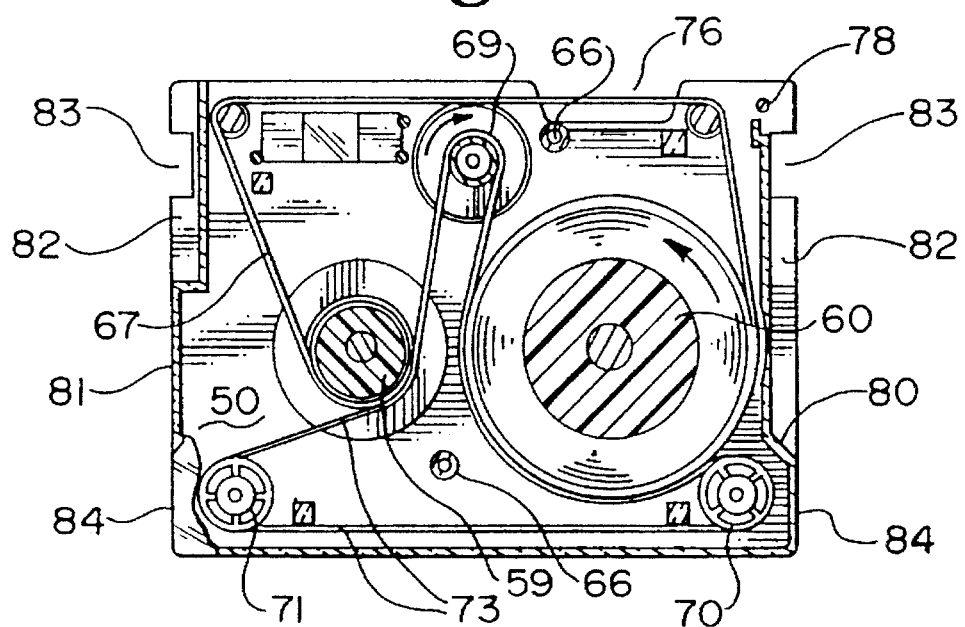
FIG. 9 is a top view, in partial section, of the tape cartridge of FIG. 5 showing the rotation of the tape and endless belt.

As with existing tape cartridge 10, tape cartridge 50 as shown in FIG. 6 includes a base plate 55 and a cover 57, together defining a relatively thin, generally rectangular enclosure having a front wall 58. As seen in FIGS. 5 and 9, within cover 57 are reel hubs 59 and 60, tape guides 61, 62 and 63, supports 65, screw holes 66, tape 67, belt driving capstan 69, belt guide rollers 70 and 71 and drive belt 73. An opening 75 in front wall 58 of cover 57 provides access for a drive roller 54, part of tape transport portion 52 of the tape drive. Similarly, a cutaway portion 76 in front wall 58 allows read/write assembly 51 of tape transport portion 52 to contact magnetic tape 67. When tape cartridge 50 is not inserted in the tape drive, cutaway portion 76 is normally covered by a door 77, which is pivoted on stud 78 and biased by torsion spring 79 towards its closed position, flush with front wall 58.

The tape drive operation of tape cartridge 50 is similar to that of tape cartridge 10; however, in normal read/write operation, the tape 67 is advanced at a speed of less than about 1 in/s (2.54 cm/s). While the lower tape speed of the arcuate scanning tape drive might allow for a simpler tape drive operation, the preferred embodiment of the arcuate scanning tape drive includes a fast scan feature where a selected portion of tape 67 is read as the tape is advanced past the read/write assembly 51 at much faster speeds. This feature, combined with the manufacturing advantages of having similar internal components, is why tape cartridge 50 preferably uses tape drive operation components that are identical to those of tape cartridge 10.

In addition to the standard tape drive operation elements, tape cartridge 50 of the preferred embodiment has three unique mechanical differences from tape cartridge 10. First, cutaway portion 76 is increased in size to accommodate the larger size of read/write assembly 51 of the preferred arcuate scanning tape drive. Second, the size and centerline of opening 75 are slightly modified to accommodate the mechanics of drive roller 54. For example, the centerline of opening is offset slightly to the right of the centerline of drive roller 54 due to interference problems in the operation of drive roller 54 of the preferred arcuate scanning tape drive. Finally, at least one of side walls 80 and 81 is provided with a mutually incompatible mechanical cartridge lockout mechanism. Each of these mechanical difference will be described in detail.

Referring to FIGS. 1 and 5, the cutaway portion 36 of the standard tape cartridge 10 does not provide sufficient room for the read/write assembly 51 to fully penetrate the tape 27. Thus, the drum diameter of an arcuate scanning read/write assembly 51 would need to be reduced from its preferred size, thereby decreasing the total data capacity that could be recorded. Alternatively, a mechanism within the arcuate scanning tape drive would have to pull the tape 27 from the cartridge 10 in order to allow the larger arcuate scanning read/write assembly 51 to fully access the tape 27. This option has the disadvantage of complicating tape handling and unnecessarily increasing the costs of the arcuate scanning tape drive. In the preferred embodiment, the present invention, solves this problem by providing a door cutaway portion 76 that is enlarged from the standard mini-cartridge cutaway portion 36 to allow an arcuate scanning read/write assembly 51 to enter the cartridge 50 and access the full width of the magnetic tape 67.

As with the cutaway portion 76, opening 75 of the preferred embodiment of cartridge 50 shown in FIG. 6 is enlarged in length as compared to opening 35 of the standard mini-cartridge 10, although the preferred embodiment is not as tall as the standard mini-cartridge 10. In this case, the larger read/write assembly 51 of the arcuate scanning tape drive, as shown in FIG. 5, interferes with the normal positioning of the drive roller 54. Hence, the drive roller 54 of the arcuate scanning tape drive is offset to resolve this interference problem and, as a result, the opening 75 is enlarged to accommodate the shifted position of the drive roller 54.

Referring to FIGS. 6–9, the mutually incompatible mechanical cartridge lockout mechanism of the preferred embodiment is implemented along one or both of a pair of side walls 80 and 81 of the cover 57. The opposed side walls 80 and 81 of cartridge 50 each include a recess or indented channel 82 defined along a portion of each of the side walls sufficient to expose a corresponding outermost portion of each side of base plate 55, including positioning notch 83. At the rear portion of each side wall 80 and 81, a series of series of ridges and grooves provide a gripping portion 84 to allow a user to easily handle and insert cartridge 50 by gripping cartridge 50 between a thumb and a finger, for example, positioned at gripping portions 84. A physical read/write indicator 85 is positioned on front wall 58 to interact with a sensing mechanism/circuit 86 in tape transport portion 50 to determine the write protection status of the tape cartridge 50. The mutually incompatible mechanical cartridge lockout mechanism comprises a pair of physical features preferably incorporated into side walls 80 and 81 of tape cartridge 50.

Figure 10:
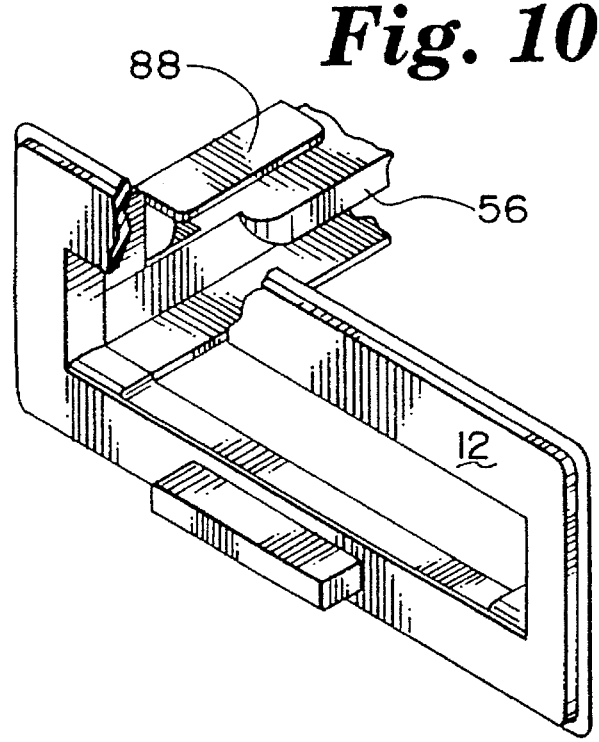
FIG. 10 is a partial cutaway perspective of a portion of a belt-driven tape drive showing a rail member adapted to interface with the tape cartridge of FIG. 5.

As with tape cartridge 10, each side wall 80, 81 has an indented channel portion 82 open to and extending a predefined length, less than the length of the side walls 81, backward from the front wall 58 channel portion 82 mates with a corresponding cartridge guide 56 in the arcuate scanning tape drive to stabilize tape cartridge 50 within the arcuate scanning tape drive. Unlike tape cartridge 10, however, one or both of the indented channel portions 82 have an abutting face 86 perpendicular to and integral with that side wall 80 or 81 and located at a distance from front wall 58 shorter than the predefined length of indented channel portion 42 of cartridge 10, to prevent corresponding cartridge rail 16 in the standard tape drive from mating with indented channel portion 82. Side wall 80 or 81 of cover 57 is provided with additional material or structure for abutting face 86 such that abutting face 86 is essentially rearward of notch 83 and forward of gripping portion 84 at a distance shorter than the full insertion mating distance of cartridge guide 16. Abutting face 86 prevents tape cartridge 50 from being fully inserted into the standard tape drive. As shown in FIG. 10, a corresponding cartridge rail 56 of the arcuate scanning tape drive is shorter than cartridge rail 16, mating with indented channel 82 to allow tape cartridge 50 to be fully inserted in the arcuate scanning tape drive. The location of abutting face 86 allows cartridge rail 56 to perform its required stabilization functions, yet still provides for the incompatibility of tape cartridges 10 and 50 without altering the form factor of tape cartridge 50.

Unlike tape cartridge 10, one or both of side walls 80 and 81 have a countersunk lip 87 defined along a portion of a top edge of side walls 80 and 81. Lip 87 mates with a corresponding lockout flange 88 in the arcuate scanning tape drive as shown in FIG. 10. The absence of a similar countersunk lip 87 on tape cartridge 10 prevents standard tape cartridge 10 from being fully inserted into the improved tape drive, due to the lockout flange 88 interacting with the non-countersunk top edge of side walls 40 and 41.

We claim:

1. A housing for a first belt-driven tape cartridge that has a form factor, the housing being substantially similar to but incompatible with a second belt-driven tape cartridge having substantially the same form factor, the housing comprising:

a top plate having a top surface and periphery outline substantially the same as the periphery outline of the form factor;

a front wall perpendicularly attached to the top plate along a front edge margin of the top plate and having a front surface including:
structure defining a belt-driven tape transport aperture, and
structure defining a separate read/write access aperture;

a back wall perpendicularly attached to the top plate along a back edge margin of the top plate; and a pair of side walls perpendicularly attached to the top plate along respective side edge margins of the top plate, each side wall having a side surface, at least one of the side walls including a countersunk lip having transverse edges defined along a portion of the side edge margin of the top plate and indented from the top surface and the side surface, and at least one of the side walls including an indented rail-mating channel defining a rib along the top of the portion of the side wall and extending backward along a portion of the side wall from the margin of the front surface that is less than a distance of a corresponding indented channel in the second tape cartridge, whereby the housing for the first tape cartridge has substantially the same form factor as a second tape cartridge, but the first tape cartridge can not be inserted into a tape drive for reading the second tape cartridge due to the distance of the indented rail-mating channel of the one of the side walls being less than the distance of the corresponding indented rail-mating channel in the second tape cartridge, and the second tape cartridge cannot be inserted into a tape drive for reading the first tape cartridge due to a lack of the countersunk lip on the one of the side walls.

2. An improved belt-driven tape cartridge having a form factor, the improved cartridge being mutually incompatible with a second belt-driven tape cartridge of the same form factor, the second tape cartridge including:

a base plate having dimensions and a periphery outline in accordance with the form factor of a second tape drive that receives the second tape cartridges;

a belt-driven tape transport system mounted on the base plate for presenting a magnetic recording tape along a front edge of the periphery outline; and a cover attached to the base plate having a front wall, a pair of side walls each having a length, a back wall and a top, the front wall including:
structure defining a drive aperture for permitting a drive mechanism in the second tape drive to access the tape transport system to control the motion of the magnetic recording tape, and
structure defining a read/write aperture for permitting a magnetic read/write assembly in the second tape drive to access the magnetic tape for read/write operations;

each side wall having an indented rail-mating channel portion open to and extending a predefined length less than the length of the side walls backward from the read wall for mating with a corresponding cartridge rail guide in the second tape drive to stabilize the second tape cartridge within the second tape drive, the improvement comprising:

an abutting lace perpendicular to and integral with one of the side walls and located at a distance from the front wall shorter than the predefined length of the indented rail-mating channel portion to prevent the corresponding cartridge guide in the second tape drive from mating with the indented rail-mating channel portion; and a countersunk lip defined along a portion of a top edge of one of the side walls that mates with a corresponding lockout flange in an improved tape drive to prevent the second tape cartridge from being fully inserted into the improved tape drive, whereby the improved tape cartridge has substantially the same form factor as the second tape cartridge but is mechanically mutually incompatible with the second tape cartridge.

3. A first tape cartridge having a form factor, the first cartridge being mechanically mutually incompatible with a second tape cartridge of the same form factor comprising:

a base plate having dimensions and a periphery outline in accordance with the form factor;

means mounted on the base plate for presenting a magnetic recording tape along a front edge of the periphery outline to be accessed by an external magnetic read/write assembly; and a cover mounted on the base plate having external dimensions and a periphery outline in accordance with the form factor, the enclosure including:

at least one opening along the front edge of the periphery outline to allow the magnetic read/write assembly to access the magnetic recording tape; and a pair of side walls perpendicular to the front edge, each side wall having an indented portion recessed inward from the corresponding edge of the periphery outline beginning at the front edge and continuing back from the front edge for a first distance on one of the side walls and a second, shorter distance on the other of the side walls, one of the side walls further having a countersunk lip on a top edge, whereby the first tape cartridge has the same form factor as the second tape cartridge but is mechanically mutually incompatible with the second tape cartridge.

4. A housing for a first belt-driven tape cartridge having a form factor, the cartridge being substantially similar to but incompatible with a second belt-driven tape cartridge of the same form factor, the second tape cartridge including a pair of identical indented rail-mating channels along a respective one of each of a pair of side walls for mating with a pair of identical mounting rails in a tape drive for reading the second tape cartridge, the housing for the first tape cartridge comprising:

a top plate having a top surface and periphery outline substantially the same as the periphery outline of the physical form factor;

a front wall perpendicularly attached to the top plate along a front edge margin of the top plate;

a back wall perpendicularly attached to the top plate along a back edge margin of the top plate;

a first side wall and a second side wall perpendicularly attached to the top plate along respective side edge margins of the top plate a front surface on the front wall including:

structure defining a tape transport aperture, structure defining a separate read/write access aperture, and a door covering the read/write access aperture and pivoting about an axis that is adjacent a corner of the front wall along the first side wall and perpendicular to the top plate, the door including a portion that extends beyond the axis to the side margin of the first side wall;

a first indented rail-mating channel extending backward along a portion of the first side wall from the front edge margin a distance that is substantially the same as a distance of the identical indented rail-mating channel in the second tape cartridge such that a mounting rail in a tape drive for reading the first tape cartridge will engage the portion of the door that extends beyond the axis as the rail slides along the indented rail-mating channel to open the door and provide access to the read/write access aperture; and a second indented rail-mating channel extending backward along a portion of the second side wall from the front edge margin a distance that is substantially less that the distance of the indented rail-mating channel of the second tape cartridge such that the first tape cartridge can not be inserted into the tape drive for reading the second tape cartridge.

5. An improved belt-driven tape cartridge having a form factor, the cartridge being mutually incompatible with a second belt-driven tape cartridge of the same form factor, the second tape cartridge including:

a base plate having dimensions and a periphery outline in accordance with the form factor of a second tape drive that receives the second tape cartridges;

a belt-driven tape transport system mounted on the base plate for presenting a magnetic recording tape along a front edge of the periphery outline; and a cover attached to the base plate having a from wall, a first side wall and a second side wall each having a length, a back wall and a top, the front wall including:

structure defining a drive aperture for permitting a drive mechanism in the second tape drive to access the tape transport system to control the motion of the magnetic recording tape, structure defining a read/write aperture for permitting a magnetic read/write assembly in the second tape drive to access the magnetic tape for read/write operations, and a door covering the read/write access aperture and pivoting about an axis that is adjacent a corner of the front wall along the first side wall and perpendicular to the top plate, the door including a portion that extends beyond the axis to the side margin of the first side wall;

each side wall having an indented rail-mating channel portion open to and extending a similar predefined length less than the length of the side walls backward from the read wall for mating with a corresponding cartridge guide rail in the second tape drive to stabilize the second tape cartridge within the second tape drive, the cartridge guide along the first side wall also engaging the portion of the door that extends beyond the axis as the cartridge guide rail slides along the indented rail-mounting channel so as to open the door and provide access to the read/write access aperture, the improvement comprising:

an abutting face perpendicular to and integral with the second side wall and located at a distance from the front wall shorter than the predefined length of the indented rail-mating channel portion to prevent the corresponding cartridge guide rail in the second tape drive from mating with the indented rail-mating channel portion of the second side wall, whereby the improved tape cartridge has substantially the same form factor as the second tape cartridge and allows a cartridge guide rail in a different tape drive to mate with the indented rail-mating channel portion along the first side wall so as to open the door and provide access to the read/write access aperture, but is otherwise mechanically incompatible with the second tape cartridge.

* * * * *

UNITED STATES PATENT AND TRADEMARK OFFICE
CERTIFICATE OF CORRECTION

PATENT NO.: 5,480,103

DATED: January 2, 1996

INVENTOR(S): Gerfast et al.

It is certified that error appears in the above-identified patent and that said Letters Patent is hereby corrected as shown below:

Col. 2, line 63, "wall" should be --walls--.

Col. 10, line 51, "comer" should be --corner--.

Signed and Sealed this

Thirteenth Day of August, 1996

Attest:

BRUCE LEHMAN

Attesting Officer

Commissioner of Patents and Trademarks